United States Patent Office 3,417,043
Patented Dec. 17, 1968

3,417,043
EXTRUDABLE STABILIZED ELASTOMERIC POLYESTER SPINNING SOLUTIONS
Walter J. Polestak, Summit, N.J., assignor to Celanese Corporation, a corporation of Delaware
No Drawing. Filed Oct. 13, 1965, Ser. No. 495,705
19 Claims. (Cl. 260—33.4)

ABSTRACT OF THE DISCLOSURE

An amino compound of a particular kind is incorporated into an extrudable liquid composition, specifically a spinning solution comprising a substantially linear, segmented elastomeric copolymer, e.g., a polyurethane, which is dissolved in a solvent such as a halogenated hydrocarbon or a mixture of a halogenated hydrocarbon and a lower aliphatic alcohol, in order to stabilize the said copolymer against degradation in the aforesaid solvent. The amino compound is at least one member of the group consisting of the following:
(a) alkanoltertiary-amines, e.g., N,N-diiospropylethanolamine, tri-isopropanolamine, and N-phenyldiethanolamine;
(b) tertiary-amine oxides, e.g., cetyl dimethylamine oxide and lauryldimethylamine oxide;
(c) cyclic tertiary-aminoethers, e.g., N-methylmorpholine, N-ethylmorpholine and N-phenylmorpholine; and
(d) cyclic ethers containing secondary- or tertiary-alkylamines, e.g., N-methylfurfurylamine, N-methyltetrahydrofurfurylamine, N,N-dimethylfurfurylamine and N,N-dimethyltetrahydrofurfurylamine.

The stabilized solutions are useful in making spandex fibers.

---

This invention relates broadly to compositions of matter and, more particularly, to extrudable liquid compositions, e.g., spinning solutions, containing polymeric (including copolymeric) or polymer-forming material(s). Still more particularly the invention is concerned with extrudable, stabilized, liquid compositions comprising (A) a substantially linear, segmented, elastomeric copolymer (e.g., a polyurethane) dissolved in a solvent and (B) a stabilizer comprising at least one amino compound of a particular kind. A single or a plurality (e.g., two, three or any desired higher number) of the amino compounds may constitute the stabilizer which, of course, is present in a stabilizing amount; or it may be used in conjunction with other stabilizers of polymeric solutions including the polymer (or polymer-forming) component(s) thereof.

The amino compound used in practicing the present invention is at least one member of the group consisting of
(a) alkanoltertiary-amines;
(b) tertiary-amine oxides;
(c) cyclic tertiary-aminoethers; and
(d) cyclic ethers containing secondary- or tertiary-alkylamines.

In one method of spinning segmented, elastomeric copolymers, the copolymers is dissolved, usually at an elevated temperature, in a suitable solvent, e.g., solvents that can be broadly defined as one or more halogenated hydrocarbons or as mixtures of one or more halogenated hydrocarbons and one or more alkanols. These solutions are subsequently employed to spin the elastomeric fibers. It has been found, however, that under the influence of heat, shear and time the dissolved copolymer shows a loss in its inherent viscosity (I.V.) and an increase in color. As a consequence, the stability of the spinning solution is affected, and the resulting fibers reveal poor and undesirable physical properties and color development.

I have found that the presence of a small amount (i.e., a stabilizing amount) of at least one amino compound of the above-described class is effective in preventing degradation of the elastomeric copolymer, in solution, from the standpoint of intrinsic or inherent viscosity and color retention. Usually the presence of from about 0.05 to about 10% by weight of the solution of the amino compound is sufficient to effect the improved stability of the solution.

The term "segmented elastomeric copolymers" as used throughout this specification and in the claims is meant to describe elastomeric copolymers comprised of two principal types of segments which are chemically connected and alternate in the copolymer chain. One segment, which is essentially amorphous, is derived from low-melting amorphous polymers such as, for example, an ester polymer, an ether polymer, a hydrocarbon polymer, a polyamide or a polyurea. The other segment is derived from a crystalline, high-melting polymer such as, for example, crystalline, high-melting amide, urea or urethane polymers. Examples of such elastomeric polymeric materials include polyesterurethanes, polyetherurethanes, poly(esteramideurethanes), poly(esteretherurethanes), and the like.

In particular, the amorphous segments of these elastomers are derived from low-melting polymers having a melting point below about 50° C., having a molecular weight above about 600 and containing terminal radicals possessing active hydrogen atoms. The crystalline or hard segments are derived from linear crystalline polymers having a melting point above about 200° C. in their fiber-forming molecular-weight range, i.e., above about 5000. The amorphous segments, as present in the elastomer, appear as radicals of the initial polymer from which the terminal active hydrogens have been removed. Generally, the crystalline segments comprise from about 10% to about 40% by weight of the segmented copolymer and may be defined as comprising at least one repeating unit of the linear crystalline polymer from which they are derived.

The preparation of these segmented elastomeric copolymers is well known in the art and is described in, for example, U.S. patents, Nos. 2,625,535, 2,813,776, 2,871,218, 2,953,839, 2,957,852, 2,962,470, and Reissue 24,691.

The polymeric structure of some of these elastomers may be represented by the formula for the respective segments which repeat in the polymer chain in which the amorphous segment has the formula

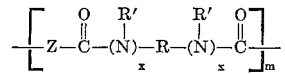

and the crystalline segment has the formula

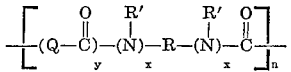

wherein Z is a bivalent organic radical that is inert to isocyanate groups at room temperature; R is a bivalent organic radical; Q is a bivalent chain-extending radical, preferably a member of the class consisting of hydrazo and organic diamino; m and n are integers greater than 0; x and y are integers from 0 to 1 with the provision that when one is 0 the other is 1; and R' is a member of the class consisting of hydrogen and monovalent organic radicals. More particularly, Z is the residue resulting from the removal of all or part of each of the terminal functional groups of a polymer melting below 50° C., having a molecular weight above about 600 and containing terminal functional groups possessing active hydrogen. For example, when the terminal functional group is —COOH, the entire group would be removed. When it is —OH, the terminal hydrogen atom would be removed. Terminal functional groups possessing active hydrogen can be for example —OH, —NH$_2$, —SH, —COOH, —CONH$_2$, =NH, —CSNH$_2$, —SO$_2$NH$_2$ and —SO$_2$OH. The bivalent radicals Q, R and Z should be free of active hydrogen. Chain-extending radical Q may be derived from chain extenders such as, for example, hydrazine and substituted hydrazines, organic diamines, glycols, amino alcohols, etc. Chain extension may also be effected by using water.

Generally, these synthetic elastomers are copolymer formulations based on low-molecular-weight aliphatic polyesters or polyethers having terminal hydroxyl and/or carboxyl groups which are capable of further reaction with diisocyanates. This latter reaction can be used to couple the lower-molecular-weight polyester or polyether via urethane links, or the diisocyanate can be used in excess so that it becomes a terminal group. In this latter case, the macrodiisocyanates formed can be coupled by means of other reagents such as water, diols, amino alcohols and diamines with the subsequent formation of the high polymer. These elastomeric products are also known block copolymers.

Illustrative of the types of elastomer copolymers suitable for employment in formulating the improved spinning solution of my invention are isocyanate-modified polyesters such as those described in U.S. Patent 2,755,266 wherein linear polyesters prepared from polycarboxylic acids and polyhydric alcohols are reacted with an excess of a diisocyanate over the terminal hydroxyl groups of the polyester to form diisocyanate-modified polyesters containing terminal isocyanate groups and then further reacting the polymer with a bifunctional cross-linking agent. Polyesterurethane copolymers that are substantially free of cross-links, such as those described in U.S. Patent 2,871,218, also may be employed. In such copolymers a critical ratio of an essentially linear hydroxyl-terminated polyester prepared from a saturated aliphatic glycol having terminal hydroxyl groups and a dicarboxylic acid or its anhydride, and a diphenyl diisocyanate are reacted in the presence of a saturated aliphatic-free glycol having terminal hydroxyl groups so that no unreacted isocyanate and hydroxyl groups remain. Broadly, such a copolymer is obtained by reacting one mole of polyester with from 1.1 to 3.1 moles of a diphenyl diisocyanate in the presence of from about 0.1 to 2.1 moles of free glycol. Another type of elastomeric copolymer that can be used in my invention is the type described in U.S. Patent 2,957,852. An elastomer of this type can be prepared by providing polyether glycol with isocyanate ends by reaction with a diisocyanate. This "capped" prepolymer can then be reacted with a chain-extension agent such as a hydrazine thereby to obtain a final polymer having repeating units containing hydrazine resins linked through carbonyl groups.

The spinning solutions of this invention usually have a solids content ranging from about 5 up to about 30% by weight, based on the total solution of the fiber-forming elastomers such as those described above. The spinning solution can also contain up to about 5% by weight, based on the elastomer present, of pigments such as, for example, titanium dioxide. Minor amounts of additives such as antioxidants can also be included in the spinning solutions; however, care must be exercised in the selection of the additives since some compositions tend to degrade the polymer.

The solvents employed in the improved spinning solutions to which this invention relates are volatile (volatilizable) organic liquids. They include volatile halogenated hydrocarbons or mixtures of a volatile halogenated hydrocarbon and a volatile alcohol, such as, for example, the lower haloalkanes (lower-alkylene halide) or mixtures of a lower haloalkane and a lower aliphatic alcohol. The contemplated lower haloalkanes suitably contain at least one halogen (preferably chlorine) atom and at least one hydrogen atom attached to each carbon atom in the molecule, e.g., methylene chloride and/or ethylene chloride; or other lower-alkylene halide, especially the chloride, bromide or chloride-bromide. Chloro-fluoro hydrocarbons such as the various Freon® normally liquid chloro-fluoro hydrocarbons also may be employed as the sole solvent or as a component of a "mixed" solvent. The preferred lower-alkanols are methanol, ethanol and isopropanol.

Illustrative examples of other solvents that may be used in preparing the stabilized polymer solutions of this invention are methylal (dimethoxymethane), tetrahydrofuran (tetramethylene oxide) and ethylene glycol dimethyl ether.

Improved stability of the spinning solutions is particularly noticeable when employing a solvent such as methylene chloride or a mixture of methylene chloride and methanol. When employing a haloalkane-aliphatic alcohol solvent mixture in the improved spinning solutions of my invention, the haloalkane should constitute at least 50% by volume of the entire solvent and preferably comprises or consists essentially of from about 60% to about 95% by volume of the solvent while the aliphatic alcohol comprises or consists essentially of from about 40% to about 5% by volume.

Referring now to the second paragraph of this specification wherein are listed under (a), (b), (c) and (d) the members of the group to which the amino compounds employed in practicing the present invention belong, specific illustrative examples of amino compounds belonging to the various sub-groups constituting the main group are as follows:

(a) N,N-diisopropylethanolamine, triisopropanolamine, and N-phenyldiethanolamine;
(b) Cetyl dimethylamine oxide and lauryl dimethylamine oxide;
(c) N - methylmorpholine, N - ethylmorpholine and N-phenylmorpholine; and
(d) N-methylfurfurylamine, N-methyltetrahydrofurfurylamine, N,N-dimethylfurfurylamine and N,N-dimethyltetrahydrofurfurylamine It is believed that the polymer degradation processes are initiated by the combined actions of heat, shear and the solvent. Acidic species formed in solution attack and open such susceptible bonds as, for example, the allophanate, ester and urethane linkages, causing chain rupture or scission at random points along the chain. This breakdown of the copolymer leads to a reduction in the intrinsic viscosity of the copolymer as well as to the introduction of undesirable color effects. It is believed that the present stabilizers function as acid acceptors, i.e., they combine with the acids formed during the copolymer dissolution and mixing. In addition to providing inherent viscosity stability, the amine stabilizers used in practicing this invention generally also reduce the formation of polymer color due to the action of heat and subsequent polymer breakdown.

I have also found that my invention is effective when employed with spinning solutions comprising blends of comparatively flexible and comparatively stiff segmented, elastomeric copolymers.

In this aspect of the invention, both the stiff and the flexible copolymers are of the type described above. For example, both the stiff and the flexible copolymers can be synthesized from substantially the same starting material or at least starting materials of the same type. Thus, a soft or flexible copolymer of the type described in U.S. Patent 2,871,218 can be produced by employing as starting materials larger proportions of the linear polyester and the aliphatic glycol thereby producing a segmented copolymer having a greater number of amorphous or soft blocks. Similarly, a higher-molecular-weight amorphous polymer employed as a starting material will provide a copolymer having longer soft blocks. To obtain a comparatively stiff copolymer a larger proportion of the diisocyanate, the linear crystalline component, can be employed thereby to produce a segmented copolymer having a larger number of rigid blocks or a copolymer having longer rigid blocks depending upon the relative proportions of the other ingredients or upon the molecular weight of the polyester. Thus, it will be seen that the stiffness or flexibility of the resulting copolymer can be affected by only very small variations in the molar ratios of the ingredients and/or by the use of a polyester of a higher or lower molecular weight.

All values of inherent viscosity in the specification are calculated from the equation:

$$\text{Inherent viscosity} = \frac{\ln R}{C}$$

wherein R is the viscosity of a solution of 0.5 gram of the polymer in 100 milliliters of meta-cresol at 30° C. divided by the viscosity of meta-cresol in the same units and at the same temperature, and C is the concentration of the polymer solution in grams of polymer per 100 milliliters of solution.

In order that those skilled in the art may better understand how the present invention can be carried into effect, the following examples are given by way of illustration and not by way of limitation. All parts and percentages are by weight unless otherwise stated.

EXAMPLE 1

In this example a group of amino compounds, including some of those with which this invention is concerned, were screened to determine their effectiveness as a stabilizer. A polyesterurethane copolymer (I.V.=1.00) of the type described in U.S. Patent 2,871,218 and obtained by reacting hydroxyl-terminated poly(tetramethylene adipate) (mol. wt. about 1000), butanediol-1,4 and diphenyl methane-p,p′-diisocyanate in a molar ratio of 1.0:1.0:2.0, respectively, was dissolved in a methylene chloride/methanol (91/9 by volume) solvent mixture at a temperature of about 65° C. The quantity of copolymer employed was sufficient to provide a solution of 20% by weight solids based on the weight of the total solution. Samples of this solution were separated and combined with varying proportions of different amino compounds. Two samples of copolymer solution to which no amino compound had been added were maintained as controls.

Each of the samples was placed within a glass pressure bomb provided with a stainless-steel cap and tumbled in an oil bath, which was controlled to maintain a constant temperature of 65° C.±0.5° C., for 118 hours. The residue was recovered from each of the glass bombs and subsequently dried under vacuo at room temperature (about 25° C.). I.V. determinations of each of the residues were made, and their color also was noted. The results obtained for each of the samples, including the two control samples, are given in Table I.

effective as a stabilizer (the I.V. was reduced from 0.67 to 0.54); and 2,6-dimethylmorpholine (also a cyclic sec.-aminoether) showed about the same I.V. as that of the control (0.67 I.V. for the control and 0.68 I.V. for the sample containing the 2,6-dimethylmorpholine). In marked contrast the stabilizers of this invention, specifically the N-methyl- and N-ethylmorpholines and N,N-diisopropylethanolamine, all had a substantial stabilizing effect on the copolymer, the initial I.V. of which was 1.00.

EXAMPLE 2

Same as in Example 1 with the exceptions that only N-ethylmorpholine was used as a stabilizer in a concentration of 1.1% by weight of the solution, the solvent was a mixture of, by volume, 80% methylene chloride and 20% methanol; and the time that the vessel containing the mixture was tumbled in an oil bath was 7 hours instead of 118 hours. Increasing the methanol content of the two-component solvating system tends to increase the rate of polymer degradation. The results are summarized below:

| Additive | I.V. | Color of residue |
|---|---|---|
| Control (no additive) | 0.67 | Amber. |
| N-ethylmorpholine | 0.81 | Yellow. |

EXAMPLE 3

This example illustrates that the order in which the stabilizer and the other ingredients are brought together has no material effect upon the usefulness of the amino compound as a stabilizer.

The procedure was the same as in Example 1 with the exceptions that a completely glass system was used; only N-ethylmorpholine was used as a stabilizer; the sequence of the addition of solvent, copolymer and stabilizer were varied; and the time that the mixture was tumbled in an oil bath at about 65° C. was 116 instead of 118 hours. As in Example 1, the amount of N-ethylmorpholine stabilizer was 0.6 weight percent based on the weight of the solution. The color of the residue of the control sample was amber, while the color of the residues from all of the other tests was yellow. The results are summarized below:

| Additive | Sequence of addition of solvent, polymer and stabilizer | I.V. |
|---|---|---|
| Control (no additive) | | 0.73 |
| N-ethylmorpholine | Solvent moisture+polymer+additive. | 0.86 |
| Do | Polymer+solvent mixture+additive. | 0.86 |
| Do | MeCl₂+additive+polymer+MeOH. | 0.82 |
| Do | MeOH+additive+polymer+MeCl₂. | 0.82 |

EXAMPLE 4

This example illustrates the use of other amino compounds that are effective in practicing the present invention as well as other amino compounds that have no stabilizing effect upon the copolymer solution.

TABLE I

| Additive, percent by wt. based on solution | Group classification of additive (amine type) | I.V. | Color of residue |
|---|---|---|---|
| Control (no additive) | | 0.67 | Amber. |
| N,N-diisopropylethanolamine (0.5) | Alkanolamine (3°) | 0.81 | Light yellow with greenish tint. |
| 2,6-Dimethylmorpholine (0.6) | Cyclic aminoether (2° amine) | 0.68 | Yellow. |
| N-ethylmorpholine (0.6) | Cyclic aminoether (3° amine) | 0.86 | Do. |
| N-methylmorpholine (0.6) | do | 0.82 | Do. |
| Monoisopropanolamine (0.6) | Alkanolamine (1°) | 0.54 | Light green. |
| Control (no additive) | | 0.65 | Amber. |
| Morpholine (0.6) | Cyclic aminoether (2° amine) | 0.29 | Dark yellow. |

From the data in Table I it will be noted that morpholine (a cyclic sec.-aminoether) was ineffective in stabilizing the copolymer residue as evidenced by the reduction in I.V. from 0.65 to 0.29, although there was some color improvement; monoisopropanolamine was also in- The apparatus and procedure were the same as in Example 1 with the following exceptions: an all-glass system was used; the copolymer was the same in its general constitution except that, upon aging, its I.V. was reduced by aging from 1.00 as in Example 1 to 0.85; the time that the mixture was tumbled in an oil bath at about 65° C. was 121 instead of 118 hours; and the amount of amine additive, in percent by weight, based on the solution, was the percentage value given in parentheses in the tabulation instead of 0.6% as in Example 1. The results are summarized in Table II.

TABLE II

| Additive, percent by wt. based on solution | Group classification of additive (amine type) | I.V. | Color of residue |
|---|---|---|---|
| Control (no additive) | | 0.60 | Amber. |
| Mono-(t-octylamine) (1.0) | Primary amine | 0.55 | Light yellow. |
| N-methylfurfurylamine (0.7) | α-Alkylamino-substituted cyclic ether (2° amine). | 0.66 | Amber. |
| Cetyl dimethylamine oxide (0.4) | 3° amine oxide | 0.69 | Dark yellow. |
| Lauryl dimethylamine oxide 0.1) | do | 0.63 | Do. |
| Triisopropanolamine (0.7) | Alkanolamine (3°) | 0.75 | Yellow. |
| N-phenyldiethanolamine (0.7) | do | 0.64 | Brown. |
| Diethanolamine (0.9) | do | 0.53 | Yellow. |
| N-phenylmorpholine (0.7) | Cyclic aminoether (3° amine) | 0.73 | Do. |
| N-phenylmorpholine (0.7)* | do | 0.69 | Dark yellow. |
| Control (no additive) | | 0.61 | Amber. |
| Tetrahydrofurfurylamine (1.0) | α-Alkylamino-substituted cyclic ether (1° amine). | 0.53 | Light brown. |
| N-methyltetrahydrofurfurylamine (0.9) | α-Alkylamino-substituted cyclic ether (2° amine). | 0.69 | Yellow. |

*Stainless steel cap for the glass bomb used in this run.

Table II illustrates the stabilizing effect of typical amino compounds used in practicing the present invention other than the three shown in Table I, more particularly N - methylfurfurylamine, N - methyltetrahydrofurfurylamine, cetyl dimethylamine oxide, lauryl dimethylamine oxide, triisopropanolamine, N-phenyldiethanolamine and N-phenylmorpholine. It also shows the ineffectiveness of a primary-alkylamine, specifically mono-(t-octylamine); of a secondary-alkanolamine, more particularly diethanolamine; and of a cyclic ether containing a substituted primary-alkylamine, specifically tetrahydrofurfurylamine. Primary amines of the last-named class also may be described as being of the alkylamine type substituted in the alpha-position of a cyclic ether. Surprisingly and wholly unobvious was the fact that the cyclic tertiary-aminoether, N-phenylmorpholine, was quite effective even in contact with stainless steel (I.V. of residue of 0.73 when using an all-glass system as compared with an I.V. of 0.69 when a stainless steel cap was used for the glass bomb employed in the run).

From the foregoing description it will be noted that all of the amino compounds used in carrying the instant invention into effect display a bifunctional activity. They all contain both an acid-scavenging group, specifically an amino group, and a solvating group, specifically a hydroxyl, an ether or an oxide group. To the best of my knowledge and belief any amino compound having the aforementioned combination of at least one acid-scavenging group and at least one solvating group can be used as a stabilizer of the polymer solution with which this invention is concerned; and by which is meant more specifically any compound of the sub-groups of amino compounds set forth under (a), (b), (c) and (d) of the second paragraph of this specification.

Additional examples of amino compounds that may be employed in practicing this invention are the various N-alkyl (e.g., N-methyl- through N-lauryl)dimethanolamines, - diethanolamines, - di - n-propanolamines,-diisopropanolamines and the corresponding N-alkyl-substituted butanol-, pentanol- and hexanolamines wherein the alkyl, including cycloalkyl (e.g., cyclopentyl, cyclohexyl, etc.), and alkanol groupings are in either normal or isomeric forms; the various N,N-dialkylmono-alkanolamines wherein the alkyl and alkanol groups correspond to the aforementioned N-alkyldialkanolamines; the various trialkanolamines other than the previously mentioned triisopropanolamine, e.g., triethanolamine, tri-n-propanolamine and the higher members of the homologous series of alkanolamines, and especially lower-alkanolamines; N-aralkyl (e.g., N-benzyl)dialkanolamines, and the N,N-diaralkyl (N,N-dibenzyl)monoalkanolamines wherein the alkanol group(s) correspond to the aforementioned alkanol groups in the described N-alkyldialkanolamines; the various N-aryldialkanolamines and N,N-diarylmonoalkanolamines other than the previously mentioned N-phenyldiethanolamine, e.g., N-phenyldiisopropanolamine, N - phenyldi-n-butanolamine, N,N-diphenylmonoethanolamine, N,N-diphenylmono-n-propanolamine, and higher members of the homologous series of these substituted alkanolamines; and the various N-alkaryl (e.g., N-tolyl)dialkanolamines and N,N-dialkaryl (e.g., N,N-ditolyl)-monoalkanolamines wherein the alkanol groups are, for example, as described above.

Still other examples of amino compounds useful in this invention are long-chain alkyl dialkylamine oxides other than the previously mentioned lauryl dimethylamine oxide and cetyl dimethylamine oxide, e.g., those wherein the aforementioned long-chain alkyl substituent contains 7, 8, 9, 10, 11, 13, 14, 15 or 17 through 20 carbon atoms, or more, and the other lower-alkyl substituents are methyl substituents; or the long-chain alkyl grouping may be, for instance, 7 through 20 carbon atoms, or more, and the other lower-alkyl substituents are ethyl, methyl or propyl through hexyl radicals (both normal and isomeric forms). Instead of the previously mentioned N-methyl-, N-ethyl- and N-phenylmorpholines one may use various other N-alkyl-, N-aryl-, N-aralkyl- or N-alkarylmorpholines wherein the N-substituent corresponds to the N-substituents hereinbefore mentioned with regard to the amino compounds used in this invention, e.g., N-n-propylmorpholine, N-benzylmorpholine, N-tolylmorpholine, N-cyclohexylmorpholine and the like.

Other examples of cyclic ethers containing secondary- or tertiary alkylamines that may be employed are the N-ethyl through -hexylfurfurylamines, the N-ethyl through -hexyltetrahydrofurfurylamines, the N,N-diethyl through -dihexylfurfurylamines and the N,N-diethyl through -dihexyltetrahydrofurfurylamines.

Other examples of amino compounds that can be employed as stabilizers in practicing the instant invention will be apparent to those skilled in the art from the sub-groups of the main group defined in the second paragraph of this specification and from the numerous examples of such sub-groups herein given.

From the foregoing description it will be seen that the present invention provides an improvement in a process of forming an elastomeric fiber which process comprises dissolving a substantially linear, segmented, elastomeric copolymer in a solvent at an elevated temperature and at a sufficient pressure to maintain the solution in a liquid state, and maintaining the said solution at the said elevated temperature and pressure. This improvement comprises or consists essentially in incorporating into the said solution, as a stabilizer, a stabilizing amount of at least one member of the group consisting of the amino compounds set forth under (a), (b), (c) and (d) in the second paragraph of this specification.

The amino stabilizers can be used alone or in the form of admixtures with members of the same or different sub-groups. One or more of these amino stabilizers also can be used in the form of an admixture with one or more commercially available antioxidants which alone show no stabilizing tendency. Such antioxidants include 2,6-ditertiary-butyl-para-cresol which is commercially available under the trade name of Catalin Antioxidant CAO–1. Although this antioxidant, in the absence of an amino stabilizer of the kind used in practicing this invention, causes degradation of the elastomeric copolymer as evidenced by a reduction of its I.V., such effects are more than offset by the stabilizing effect of the amino stabilizer employed.

The extrudable, stabilized, liquid compositions, specifically spinning solutions, of this invention are spun into yarns by known techniques. For example, they can be spun into yarns as described in examples of copending application Ser. No. 336,618 of Walter John Polestak (the sole inventor of the present invention) and James Francis Tracy, filed Jan. 9, 1964, and assigned to the same assignee as the instant invention, with the exception that the spinning solutions contain an amino stabilizer of the kind herein described instead of an epoxy stabilizer of the kind described in the aforesaid Polestak et al. application.

In a typical solution preparation and spinning run, a yarn is spun from a solution of the comparatively stiff polyesterurethane (M.W. about 100) obtained by reacting hydroxyl-terminated poly(tetramethylene adipate), butanediol-1,4 and diphenyl methane-p,p'-diisocyanate in a molar ratio of about 1.0:1.0:2.0, respectively, and a comparatively soft or flexible polyesterurethane (M.W. about 800) obtained by reacting hydroxyl-terminated poly(tetramethylene adipate), butanediol-1,4 and diphenyl methane-p,p'-diisocyanate in a molar ratio of about 1.0:0.3:1.3, respectively. The solvent system employed is a mixture of, by volume, 91% methylene chloride and 9% methanol. The blend of comparatively stiff polyesterurethane and the comparatively flexible polyesterurethane, in a weight ratio of about 70% of the former to about 30% of the latter, is present in the above-described solvent mixture in an amount corresponding to about 25% by weight of the solution. The spinning solution also contains 0.6%, based on the solution, of an amino compound of the kind used in practicing this invention, specifically N-ethylmorpholine. Another similar spinning solution is made which additionally contains about 5% $TiO_2$ based on the weight of the polymer component of the solution. The stability of the two spinning solutions and the properties of the spun yarns are approximately the same as those described in Examples IV and V of the aforementioned Polestak et al. copending application Ser. No. 336,618 and wherein 0.6% vinylcyclohexene dioxide, based on the solution was used as a stabilizer.

The embodiments of the invention in which an exclusive property or privilege is claimed are defined as follows:

1. An improved spinning solution comprising (A) a substantially linear, segmented, elastomeric copolymer dissolved in a solvent selected from the group consisting of halogenated hydrocarbons and mixtures of halogenated hydrocarbon and lower-alkanol, the said elastomeric copolymer being comprised essentially of first and second segments which are chemically connected and alternate in the polymer chain, the first segment being derived from an essentially amorphous, linear polymer melting below about 50° C. and having a molecular weight of above about 600 and the second segment being derived from a crystalline, linear copolymer having a melting point above about 200° C. and (B) a stabilizer for the said copolymer against degradation in the presence of the said solvent, said stabilizer including at least one member of the group consisting of (a) alkanoltertiary-amines selected from the group consisting of trialkanol, dialkanolalkyl, dialkanolphenyl, dialkanolaralkyl, alkanoldialkyl, alkanoldiphenyl and alkanoldiaralkyl, wherein the alkanol groups are of 1 to 6 carbon atoms, the alkyl and aralkyl groups are of 1 to 12 carbon atoms; (b) tertiary long-chain alkyl-lower dialkyl amine oxides wherein the long chain alkyl is of 7 to 20 carbon atoms and the lower alkyl is of 1 to 6 carbon atoms; (c) cyclic tertiary-aminoethers selected from the group consisting of N-alkyl, N-aryl, N-aralkyl and N-alkarylmorpholines wherein the aryl, aralkyl and alkaryl groups are of 6 to 7 carbon atoms and the alkyl group is of 1 to 6 carbon atoms and (d) cyclic alkyl ethers containing substituted secondary- or tertiary-alkylamines wherein said alkyl groups are of 1 to 6 carbon atoms.

2. An improved spinning solution as in claim 1 wherein the first segment of the defined elastomeric copolymer comprises the residue after removal of terminal active hydrogen from a linear polymer melting below about 50° C., having a molecular weight above about 600 and containing terminal radicals possessing active hydrogen atoms, and the second segment comprises at least one repeating unit of a linear crystalline copolymer having a melting point above about 200° C. in its fiber-forming molecular-weight range; the stabilizer of (B) includes a cyclic-tertiary-aminoether; and the solvent in the spinning solution comprises, by volume, a major proportion of a lower-alkylene halide and a minor proportion of a lower-alkanol.

3. An improved spinning solution as in claim 1 wherein the substantially linear, segmented, elastomeric copolymer of (A) is a polyurethane comprised essentially of the defined first and second segments.

4. The spinning solution of claim 3 wherein the stabilizer is N,N-diisopropylethanolamine.

5. The spinning solution of claim 3 wherein the stabilizer is triisopropanolamine.

6. The spinning solution of claim 3 wherein the stabilizer is N-phenyldiethanolamine.

7. The spinning solution of claim 3 wherein the stabilizer is lauryl dimethylamine oxide.

8. The spinning solution of claim 3 wherein the stabilizer is cetyl dimethylamine oxide.

9. The spinning solution of claim 3 wherein the stabilizer is N-methylmorpholine.

10. The spinning solution of claim 3 wherein the stabilizer is N-ethylmorpholine.

11. The spinning solution of claim 3 wherein the stabilizer is N-phenylmorpholine.

12. The spinning solution of claim 3 wherein the stabilizer is N-methylfurfurylamine.

13. The spinning solution of claim 3 wherein the stabilizer is N-methyltetrahydrofurfurylamine.

14. An improved spinning solution as in claim 3 wherein the solvent component of the spinning solution consists essentially of, by volume, from about 60% to about 95% of methylene chloride and from about 40% to about 5% of methanol; and the stabilizer constitutes from about 0.05% to about 10% by weight of the total solution.

15. An improved spinning solution as in claim 3 wherein the polyurethane is at least one member of the group consisting of the polyesterurethanes, the polyetherurethanes, the poly(esteramideurethanes) and the poly(esteretherurethanes).

16. An improved spinning solution as in claim 2 wherein the elastomer copolymer of (A) is a polyurethane comprised essentially of the defined first and second segments, and the stabilizer of (B) includes an N-alkylmorpholine.

17. An improved spinning solution as in claim 16 wherein the polyurethane is a polyesterurethane and the N-alkylmorpholine is N-methylmorpholine.

18. An improved spinning solution as in claim 16 wherein the polyurethane is a polyesterurethane and the N-alkylmorpholine is N-ethylmorpholine.

19. In the process of forming an elastomeric fiber which comprises (a) dissolving a substantially linear, segmented, elastomeric copolymer dissolved in a solvent selected from the group consisting of halogenated hydrocarbons and mixtures of halogenated hydrocarbon and lower-alkanol, the said elastomeric copolymer being comprised essentialy of first and second segments which are chemically connected and alternate in the polymer chain, the first segment being derived from an essentially amorphous, low-melting polymer melting below about 50° C. and having a molecular weight above about 600 and the second segment being derived from a crystalline, high-melting polymer, melting above about 200° C. and dissolution of the said copolymer in the said solvent being effected at an elevated temperature and at a sufficient pressure to maintain the solution in the liquid state, (b) maintaining the solution at the said elevated temperature and sufficient pressure to maintain it in liquid state, and then (c) extruding the solution through a spinnerette, the improvement which comprises stabilizing the said copolymer against degradation in the presence of the said solvent under the aforementioned temperature and pressure conditions by incorporating into the said solution at least one member of the group consisting of (a) alkanoltertiary-amines selected from the group consisting of trialkanol, dialkanolalkyl, dialkanolphenyl, dialkanolaralkyl alkanoldialkyl, alkanoldiphenyl and alkanoldiaralkyl wherein the alkanol groups are of 1 to 6 carbon atoms, the alkyl and aralkyl groups are of 1 to 12 carbon atoms; (b) tertiary long-chain alkyl-lower dialkyl amine oxides wherein the long chain alkyl is of 7 to 20 carbon atoms and the lower alkyl is of 1 to 6 carbon atoms; (c) cyclic tertiary-amino-ethers selected from the group consisting of N-alkyl, N-aryl, N-aralkyl and N-alkarylmorpholines wherein the aryl, aralkyl and alkaryl groups are of 6 to 7 carbon atoms and the alkyl group is of 1 to 6 carbon atoms and (d) cyclic alkyl ethers containing substituted secondary- or tertiary-alkylamines wherein said alkyl groups are of 1 to 6 carbon atoms.

References Cited
UNITED STATES PATENTS

| | | | |
|---|---|---|---|
| 2,681,328 | 6/1954 | Stanton et al. | 260—45.9 |
| 2,962,470 | 11/1960 | Jung | 260—33.4 |
| 2,966,472 | 12/1960 | Fiel | 260—45.9 |
| 2,999,839 | 9/1961 | Arvidson | 260—45.9 |
| 3,036,979 | 5/1962 | LaVerne | 260—33.4 |
| 3,097,192 | 7/1963 | Schilit | 260—33.4 |

ALLAN LIEBERMAN, *Primary Examiner.*

L. T. JACOBS, *Assistant Examiner.*

U.S. Cl. X.R.

260—33.8, 45.9